United States Patent
Chawla et al.

(10) Patent No.: US 9,992,064 B1
(45) Date of Patent: Jun. 5, 2018

(54) NETWORK DEVICE CONFIGURATION DEPLOYMENT PIPELINE

(71) Applicant: Amazon Technologies, Inc., Seattle, WA (US)

(72) Inventors: Rachit Chawla, Kirkland, WA (US); Christopher John Rose, Seattle, WA (US); Jeremy Ryan Volkman, Seattle, WA (US); Mayilan Balachandran, Seattle, WA (US); Christopher Edward Folger, Seattle, WA (US); Kenneth Oliver Henderson, Jr., Everett, WA (US); Dmytro Taran, Dublin (IE); Abhoy Bhaktwatsalam, Bothell, WA (US); Justin Oliver Pietsch, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 437 days.

(21) Appl. No.: 14/683,487

(22) Filed: Apr. 10, 2015

(51) Int. Cl.
*G06F 15/173* (2006.01)
*H04L 12/24* (2006.01)

(52) U.S. Cl.
CPC ........ *H04L 41/082* (2013.01); *H04L 41/0816* (2013.01)

(58) Field of Classification Search
CPC ............. H04L 41/0803; H04L 41/0853; H04L 41/0859; H04L 41/028; H04L 41/0826; H04L 63/20
See application file for complete search history.

(56) References Cited

U.S. PATENT DOCUMENTS

| 7,640,317 B2* | 12/2009 | Jain ....................... H04L 41/028 709/213 |
| 2002/0112084 A1* | 8/2002 | Deen ..................... G06F 13/387 709/250 |
| 2009/0031008 A1* | 1/2009 | Elliott ................. H04L 61/1517 709/220 |
| 2015/0280988 A1* | 10/2015 | Vorst ...................... H04L 12/12 709/220 |

* cited by examiner

Primary Examiner — Yves Dalencourt
(74) Attorney, Agent, or Firm — Klarquist Sparkman, LLP

(57) ABSTRACT

The following description is directed to configuring network devices. In one example, at a network device deployment pipeline, a request can be received from a non-integrated configuration tool to configure a network device of a network. The configuration of the network device can be scheduled so that both an integrated configuration tool of the network device deployment pipeline and the non-integrated configuration tool can configure the network.

20 Claims, 8 Drawing Sheets

NETWORK DEVICE CONFIGURATION DEPLOYMENT PIPELINE

BACKGROUND

Cloud computing is the use of computing resources (hardware and software) which are available in a remote location and accessible over a network, such as the Internet. In some arrangements, users are able to buy these computing resources (including storage and computing power) as a utility on demand. Cloud computing entrusts remote services with a user's data, software and computation. Use of virtual computing resources can provide a number of advantages including cost advantages and/or ability to adapt rapidly to changing computing resource needs.

Large computer systems, including cloud computing facilities, can include many compute resources connected by an internal communications network. The network can include many network components or devices that may need to be upgraded or reconfigured during the operational lifetime of the cloud computing facility. Further, as resources are added to the cloud computing facility, new network components may be added to the network, increasing the size and complexity of the network. The cloud service provider may desire to provide high availability and throughput through the network, even during an upgrade or reconfiguration of the network.

DETAILED DESCRIPTION

Figure 1:
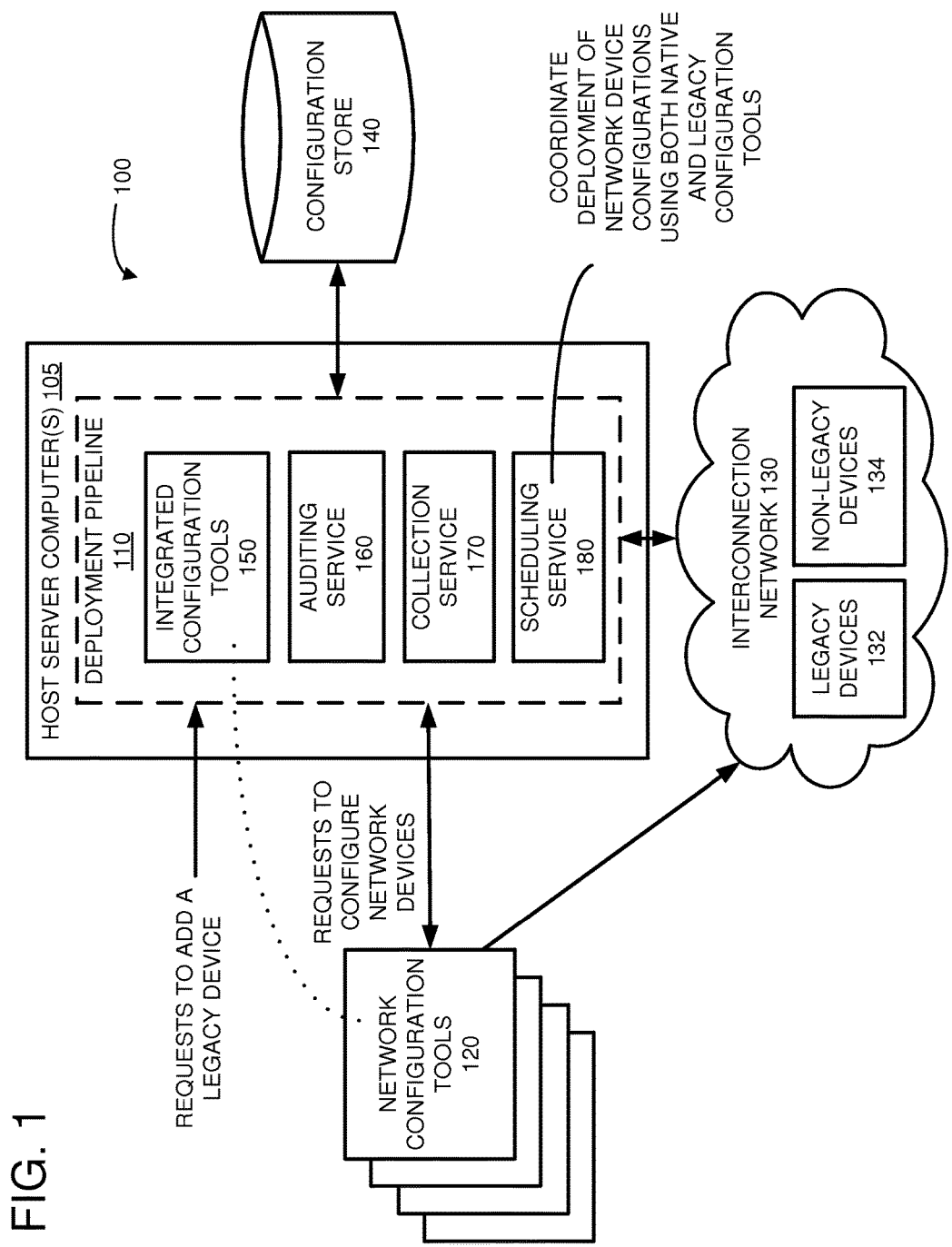
FIGS. 1 and 2 are system diagrams showing examples of network device deployment pipelines capable of coordinating configurations of network devices using configuration tools both inside and outside of the network device deployment pipelines.

The configuration information of a network device is a set of states that describes how the network device operates. For example, the configuration information can include addressing information, routing information, access control lists, access credentials, address translations, quality of service parameters, statistical gathering capabilities, protocol support, timer values, encryption parameters, device-specific tuning parameters, and/or any other information suitable for controlling and/or monitoring how the network device operates. Network devices can include switches (multilayer or single-layer), routers, repeaters, gateways, network bridges, hubs, protocol converters, bridge routers, proxy servers, firewalls, network address translators, multiplexers, network interface controllers, wireless network interface controllers, modems, ISDN terminal adapters, line drivers, and wireless access points, for example.

When the network device is updated or configured with the configuration information, the network device will operate according to the network device configuration. The configuration information of networking devices can change during the lifetime of the networking devices as users are added, other networking devices are deployed, and new security threats are discovered. Conventional methods for updating the configuration information of a networking device include remotely logging into the network device and making changes to the configuration state of the networking device. The changes may be made in response to specific issues or upgrades of the network. Over time, the network device may have been updated many times and by many different network engineers, such that the full configuration state of the network device can only be determined by reading the configuration state off of the network device. If the network device is misconfigured, such as through an operator mistake, the network may experience degraded performance or a network event, such as a severe disruption in service.

As the network grows in size and/or in heterogeneity, it is not scalable for a network engineer to log into each network device and manually make changes to the configuration state of the network device. Ad-hoc automated scripts can be written to perform updates of multiple devices. However, these scripts can cause degraded performance and/or network events if there are dependencies when updating network devices and/or if the script author is unaware of the full configuration state of the network devices. For example, a network event may occur if the script allows one network device to read intermediate configuration state from another network device during its configuration. As another example, the script may overwrite essential configuration state, of which the script author was unaware, with incompatible configuration state. As yet another example, multiple scripts may be running concurrently and the different scripts may be incompatible with each other. As yet another example, ad hoc scripts may not comply with policy rules that are in place to potentially improve maintainability, interoperability, and/or security of the network.

As described herein, network configuration management and deployment tools can potentially provide a more available, secure, scalable, and maintainable network than manual updates or ad-hoc scripting. Fully automated router provisioning, configuration, and deployments can potentially reduce availability and security risks to customers while improving change agility. An automated lifecycle management system for network devices can reduce or eliminate the need for humans (e.g., network engineers) to manually login into network devices and make network changes. Potentially all devices can be provisioned (including programmatic configuration generation, application of the configuration, validation of connections, and safely turning up the device) and managed throughout their lifecycle by automated tools, with little or no human intervention.

The automated continuous deployment pipeline is a set of tools and/or services that can be used to manage the configuration state of network devices of a network over the lifecycle of the network devices. For example, the network devices can be deployed, updated, and audited using the deployment pipeline. As a specific example, the deployment pipeline can enable a workflow that includes several stages: (1) new configurations for the network devices can be programmatically generated and stored in an authoritative configuration repository; (2) the different configurations of the devices can be tracked throughout the lifecycle of the devices with corresponding versions of configurations in the repository; (3) the different configurations can be verified to comply with policy rules of the network and with expected configurations; (4) configuration changes can be reviewed through a code-review-style approval model; (5) configurations can be validated (e.g., through basic sanity checks and lab testing); and (6) deployments of new configurations to the devices can include pre-checks, post-checks, and rollbacks to a known-good state for multiple classes of configuration changes.

An automated continuous deployment pipeline for network devices (e.g., routers) can potentially provide several benefits. An authoritative configuration can be provided potentially any time and on every device. For example, the deployment pipeline can include an authoritative configuration repository with versioned configurations for every network device. By driving all configuration changes through the repository, the repository can be kept in-sync with the actual configuration state of the network devices. For example, configurations can be collected from the network devices and audited against the deployed configurations to determine whether configurations were installed correctly and/or whether any unauthorized changes to the network device have been made.

The deployment system can potentially be simple for a user and extensible. For example, the deployment system can provide the ability to push out full configurations or incremental (diff-based) configurations for the network devices. New and existing tools can potentially be integrated into an extensible framework. Customer impact can be reduced or eliminated by using comprehensive safety checks, network policies, and fast rollback. For example, a configuration using the integrated tools can be deployed with comprehensive pre-checks and post-checks of the system. The system can integrate with monitoring systems and a metrics dashboard. The system can support automated rollback to a last-known good configuration. The deployment system can potentially reduce the risks of concurrency by including device locking. For example, the deployment framework can provide a scheduler to push configuration changes to devices and allow tools to integrate with the locking service to handle the challenges of concurrency in a multi-tool eco-system. The deployment system can potentially raise visibility through an operationally efficient user interface. For example, the deployment system can potentially provide visibility of all configuration deployments being made to the network at any time, and can potentially allow network engineers to effectively troubleshoot network events and make configuration changes during a high severity event.

However, migrating the network devices and configuration tools from an ad-hoc environment into the framework of the automated continuous deployment pipeline can be challenging. For example, there can be a high development cost associated with converting legacy configuration tools to work within the deployment pipeline. As used herein, legacy configuration tools are tools that can be used to configure network devices but do not use the services of the deployment pipeline to perform the configuration. For example, the legacy tools can be written before the deployment pipeline was implemented, and can include the ad-hoc scripts described above. Furthermore, the legacy tools may not have been designed to coordinate their actions with other configuration tools. This can be contrasted with the integrated configuration tools which are written to operate within the deployment pipeline framework. The cost of converting the legacy tools can be multiplied as the number of configuration tools increases. Some legacy tools may be worth converting while other legacy tools may not be worth converting. For example, legacy tools that perform deprecated functions or that only configure network devices that are being phased out may not be worth the investment in developer resources to fully integrate the legacy tool into the deployment pipeline. Additionally, because developer resources are not unlimited, it is likely that the conversion of legacy tools will be phased in with some legacy tools being converted before other legacy tools.

Thus, the tools for maintaining the network may be a mixed-mode environment where both the legacy configuration tools and the integrated tools of the deployment pipeline are used concurrently. It may be desirable to coordinate the actions of the legacy tools and the integrated tools of the deployment pipeline so that the tools interoperate correctly. For example, a lack of coordination can result in essential configuration state used by one tool being overwritten by another tool. As another example, intermediate configuration states being written by one tool can be read by another tool which may cause incorrect or unstable configurations to be loaded onto the network devices, potentially leading to degraded network performance or a network outage.

As described herein, a scheduling service of the network device deployment pipeline can be used for coordinating the configuration of the network devices using both the integrated configuration tools and the legacy configuration tools. In this mixed-mode environment, the scheduling service can reduce the likelihood of concurrent incompatible operations from occurring. For example, the service can prevent different tools from attempting to configure the same network device at the same time.

Another issue with migrating to an automated continuous deployment pipeline is moving legacy network devices into the deployment framework. As used herein, legacy network devices are network devices that were deployed without using the deployment pipeline. For example, the legacy network devices can be deployed before the deployment pipeline is developed or before the deployment pipeline is applied to the portion of the network containing the legacy network devices. This can be contrasted with a non-legacy device that is initially deployed using the deployment pipeline. In one solution for integrating the legacy devices, the legacy devices could be taken off-line and redeployed using the deployment pipeline. However, this may result in downtime for the network and may require considerable analysis to ensure that the redeployed legacy devices operate in the same manner as before the redeployment.

As described herein, a collection service of the deployment pipeline can be provided to collect and store the configuration state of the legacy device into an authoritative configuration store of the network device configuration pipeline. The collected configuration state can be marked as the deployed state of the legacy device and used as an initial basis for making future changes to the configuration state of the legacy device using the integrated tools of the deployment pipeline. Thus, the legacy devices can remain operational in their current configuration state as they are brought within the framework of the deployment pipeline.

Another issue with operating in a mixed-mode environment is tracking and auditing the configuration state of all of the network devices of the network. For example, the network device configuration pipeline can use the authoritative configuration store to track past, current, and future states of the network devices maintained by the integrated tools. In particular, the authoritative configuration store can be used to track: a deployed configuration state representing the last configuration state applied to the network device; a released configuration state representing the next configuration state to be applied to the network device; and a collected configuration state representing the last configuration state read from the network device. Thus, the configuration store can be used to analyze the current state of the network and to detect any unauthorized changes to the network devices. However, to fully comprehend the state of the network, it can be desirable to also track the state of the network devices updated by the legacy tools operating outside of the network device configuration pipeline.

As described herein, the scheduling service of the network device deployment pipeline can enable the tracking and auditing of the configuration state of all of the network devices of the network. For example, after a network device is configured with a legacy configuration tool, the scheduling service can call the collection service to collect and store the configuration state of the configured device into the authoritative configuration store. As an example, the collected configuration state can be stored as the released and/or deployed state of the network device. Thus, the configuration state of devices configured by legacy configuration tools can be captured, stored, and audited even though the legacy configuration tools may not have been designed to update the authoritative configuration store.

Web services are commonly used in cloud computing. A web service is a software function provided at a network address over the web or the cloud. Clients or other web services initiate web service requests to servers and servers process the requests and return appropriate responses. The web service requests are typically initiated using, for example, an application programming interface (API) request. For purposes of simplicity, web service requests can be generally described below as API requests, but it is understood that other web service requests can be made. An API request is a programmatic interface to a defined request-response message system, typically expressed in JSON or XML, which is exposed via the web—most commonly by means of an HTTP-based web server. Thus, in certain implementations, an API can be defined as a set of Hypertext Transfer Protocol (HTTP) request messages, along with a definition of the structure of response messages, which can be in an Extensible Markup Language (XML) or JavaScript Object Notation (JSON) format. The API can specify a set of functions or routines that perform an action, which includes accomplishing a specific task or allowing interaction with a software component. When a web service receives the API request, the web service can generate a response to the request and send the response to the endpoint identified in the request.

FIG. 1 is a system diagram showing an example of a network device deployment pipeline 110 capable of coordinating configurations of network devices using integrated configuration tools 150 and configuration tools 120. The deployment pipeline 110 can include one or more web services executing on one or more host server computers 105. For example, the deployment pipeline 110 can include native or integrated configuration tools 150, an auditing service 160, a collection service 170, and a scheduling service 180. The network devices can be homogeneous or heterogeneous. For example, the network devices 130 can include switches (multilayer or single-layer), routers, repeaters, gateways, network bridges, hubs, protocol converters, bridge routers, proxy servers, firewalls, network address translators, multiplexers, network interface controllers, wireless network interface controllers, modems, ISDN terminal adapters, line drivers, and/or wireless access points. The network devices can be deployed at the same time or at different times. For example, the network devices can include all or a portion of an interconnection network 130 and can include legacy network devices 132 and non-legacy network devices 134. The non-legacy network devices 134 are initially deployed using the deployment pipeline 110. The legacy network devices 132 are initially deployed without using the deployment pipeline 110, such as when the legacy network devices 132 are deployed before the deployment pipeline 110 is operational, for example.

The configuration store 140 can include a list or set of the network devices that are managed by the deployment pipeline 110. The configuration store 140 can also receive and store a configuration for each of the network devices that are managed by the deployment pipeline 110. For example, a non-legacy device can be added to the set of the network devices that are managed by the deployment pipeline 110 when the non-legacy device is initially deployed by the deployment pipeline 110. The corresponding configuration information for the non-legacy device can be stored in the configuration store 140 when the non-legacy device is deployed. As another example, a legacy device can be added to the set of the network devices that are managed by the deployment pipeline 110 in response to receiving a request to add a legacy device to the deployment pipeline 110 framework. As described further below, the corresponding configuration information for the legacy device can be stored in the configuration store 140 in response to the request.

The configuration store 140 can receive a generated configuration from one or more generation tools of the integrated configuration tools 150. The generated configuration can include a complete or a partial configuration for one or more of the network devices. Each of the network devices can have the same or different generated configurations. The generated configuration can be stored as a "released" configuration. Alternatively, the generated configuration can be stored in the configuration store 140 and reviewed by one or more network engineers and/or software tools prior to being stored as the released configuration. For example, one or more network engineers may perform a visual inspection (e.g., code review) and/or perform experiments with the generated configuration prior to releasing the generated configuration. As another example, automated software tools of the deployment pipeline 110 may perform checks on the generated configuration to determine whether the generated configuration complies with one or more policies or rules. If the generated configuration is approved as having passed the automated and/or manual checks, the generated configuration can be released. The configuration data can be stored in association with metadata about the configuration, such as a status, a version number, one or more time-stamps, a latest author, an approving manager, and/or a description of the configuration data, for example.

The released configuration can be an authoritative next-provisioned state of the network devices. In particular, the released configuration is a configuration that is ready to apply to the networking devices (such as after the configuration has been approved), but may not have been applied yet. Thus, the released configuration can represent a trusted and accurate representation of what the configuration state of the network devices should be after the network devices have been updated with the released configuration. Thus, the released configuration can differ from the current configuration state of the network devices in the time between when a new released configuration is stored and before the network devices are updated. When the network devices are updated, the released configuration can be copied to the "deployed" configuration. The deployed configuration can represent the configuration state of the network devices when they are updated by the deployment pipeline 110. Each of the network devices can have the same or different released and deployed configurations.

The collection service 170 can collect the configuration state of the network devices. For example, for non-legacy devices 134, the configuration state can be collected after a released configuration is deployed to a non-legacy device and at regular intervals thereafter. As another example, for legacy devices 132, the configuration state can be collected in response to a request to add a legacy device into the deployment pipeline 110 framework. Once the legacy device is added to the deployment pipeline 110 framework, the legacy device can be updated and audited as if it was initially deployed by the deployment pipeline 110.

The collection service 170 can monitor and collect the configuration state of the network devices 130 at different times and store the collected configuration state in multiple locations or with multiple labels. For example, when the collection service 170 receives a request to add a legacy device, the collection service 170 can store the collected configuration state as the released and/or the deployed configuration for the legacy device on the configuration store 140. Thus, the collection service 170 can initialize the released and deployed configuration states for the legacy devices 132 with the current state of the legacy devices 132.

Once a network device is added to the set of the network devices that are managed by the deployment pipeline 110, the collection service 170 can monitor the configuration state of the network device so that the configuration state can be audited. The configuration state collected from the network devices can be stored as a "collected" configuration representing the configuration state of the network devices at the time of collection. Thus, the collected configuration can represent the current-provisioned state of the network devices at the time of collection. The collected configurations can include separate stored state for each of the network devices. When the network devices are updated, the deployed configuration and the collected configuration can be the same. However, over time, the deployed configuration and the collected configuration may diverge, such as when manual changes are made to the configuration state of the network devices outside of the deployment pipeline 110 framework.

The auditing service 160 can detect a difference between the released configuration and the deployed configuration for one or more of the network devices. When a difference is detected, the auditing service 160 can generate a request to have the one or more of the network devices be updated by the integrated configuration tools 150. Thus, the request to update one or more of the network devices can come from within the deployment pipeline 110. Alternatively or additionally, a request to update one or more of the network devices can come from outside of the deployment pipeline 110, such as from the configuration tools 120. Thus, the network devices can be configured by both the configuration tools 120 and the integrated configuration tools 150.

Respective tools of the integrated configuration tools 150 can include functions for generating, auditing, deploying, performing pre- and post-checks, and/or rolling back deployments to a network device. The integrated configuration tools 150 can be used to update the network devices according to the released configuration stored in the configuration store 140. The integrated configuration tools 150 can be used to update all of the state associated with the released configuration or a portion of the state associated with the released configuration. For example, the integrated configuration tools 150 can include different tools for updating credentials, updating access control lists (ACLs), and updating routing tables. The integrated configuration tools 150 can include pre-checks, post-checks, and roll-backs. For example, pre-checks can include obtaining a lock corresponding to the network device to be configured, reading or collecting the current configuration state of the network devices to be updated, comparing the current configuration state to the deployed configuration state, checking the released configuration against a set of rules or policies, quiescing traffic and/or processes on the network devices, and aborting the update if any of the pre-checks fail. The pre-checks can be performed before the released configuration state is pushed to the network devices. The post-checks can be performed after the released configuration state is pushed to the network devices. The post-checks can include reading or collecting the current configuration state of the network devices that were updated, comparing the collected configuration state to the released configuration state, enabling traffic and/or processes on the network devices, releasing any locks corresponding to the configured network device, and initiating a roll-back if any of the post-checks fail. The roll-back can be used to push the last-known-good configuration to the network devices if the post-checks fail.

The configuration tools 120 can be used to update the configuration state of the network devices in a manner similar to the integrated configuration tools 150. However, the configuration tools 120 may not have been designed to operate using the workflow of the deployment pipeline 110. For example, the configuration tools 120 can be legacy configuration tools written fully or partially before the deployment pipeline 110 was conceived. The legacy configuration tools may be fully migrated into the deployment pipeline 110 at a future time (as indicated by the dotted line between 120 and 150), but the legacy configuration tools can be used to update the configuration state of the network devices even before the migration is complete. As another example, the configuration tools 120 can be non-integrated configuration tools that are capable of updating configuration state of the network devices without using the deployment pipeline 110. Thus, the configuration tools 120 can be capable of updating the configuration state of the network devices without coordinating their actions with other configuration tools. However, as described above, the uncoordinated configuration of the network devices can potentially lead to unstable configuration states and network downtime. To enable coordination with the deployment pipeline 110, the configuration tools 120 can include a script or code to communicate with the deployment pipeline 110. For example, when the configuration tools 120 determine that a network device is to be configured, the script can send a request to the deployment pipeline 110. The request can include a set of one or more network devices or a reference to a set of one or more network devices to be configured by the configuration tools 120. The script can wait until the request is granted before beginning to configure the network devices. The grant can be for all of the network devices of the request or for a portion of the network devices of the request. The request can indicate whether the configuration tools 120 can accept a grant for a portion of the network devices of the request. Once the request is granted, the configuration tools 120 can configure the network devices without using the services of the deployment pipeline 110. For example, the configuration tools 120 can communicate directly with the network devices of the interconnection network 130. When the configuration tools 120 are finished configuring the network devices, the script can notify the deployment pipeline 110 that the configuration is complete.

The scheduling service 180 can be used to coordinate the actions of the configuration tools 120 and the actions of the integrated configuration tools 150 so that the actions of the tools will not conflict with each other. Coordinating the tools 120 and 150 can include serializing actions performed on a given network device or set of dependent network devices. Coordinating the tools 120 and 150 can include allowing the tools 120 and 150 to work concurrently on different independent network devices. In particular, the scheduling service 180 can receive requests to configure network devices from the configuration tools 120 and requests to configure network devices from the integrated configuration tools 150 (such as when the auditing service 160 detects a difference between a released configuration and a deployed configuration for a network device). The requests can include a set of one or more network devices or a reference to a set of one or more network devices to be configured and a flag indicating whether partial grants are supported. The scheduling service 180 can coordinate the granting of the requests from the configuration tools 120 and the granting of the requests from the integrated configuration tools 150 so that the tools do not conflict when configuring the network. The scheduling service 180 can grant the request for all of the devices requested or for a portion of the devices requested.

After configuration, the updated configuration state can be read from the configured network device and stored on the configuration store 140. The integrated configuration tools 150 can automatically collect the updated configuration state of the network devices and store it on the configuration store 140. When the deployment pipeline 110 is notified that the configuration tools 120 are finished configuring the network devices, the collection service 170 can be used to read the configuration state of the configured network devices and store it on the configuration store 140. As an example, the collected configuration state can be stored as the released and/or deployed state of the network devices. Thus, the configuration state of the devices configured by both the configuration tools 120 and the integrated configuration tools 150 can be captured, stored, and audited in a single authoritative configuration store 140.

Figure 2:
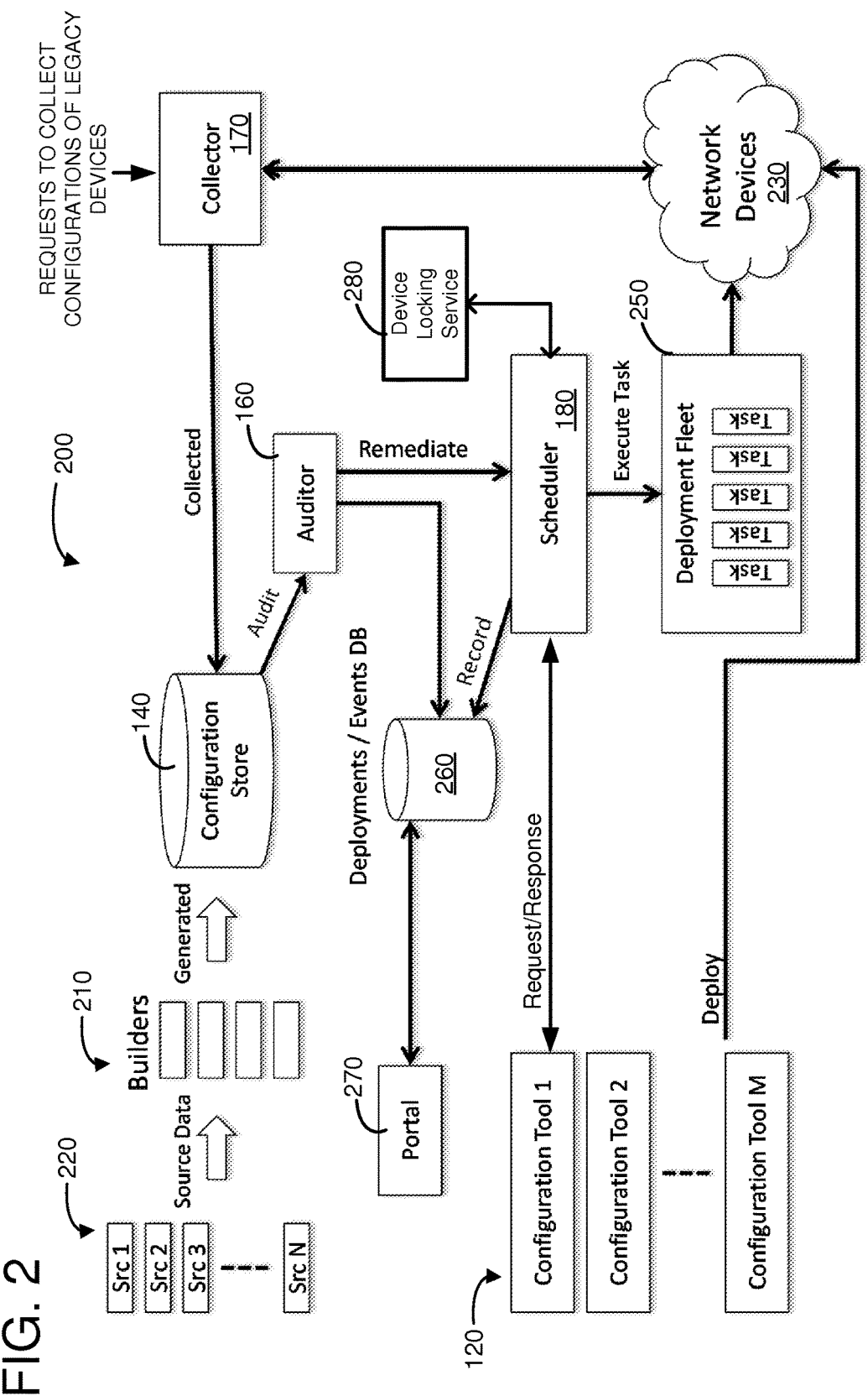

FIG. 2 illustrates a system diagram of another example of a network device deployment pipeline 200 capable of coordinating configurations of network devices using integrated configuration tools and configuration tools 120. The integrated configuration tools can include programmatic configuration generation systems (e.g., builders 210) for generating a complete configuration for a network device from a subset of configuration information for the network device. The subset of configuration information can be stored in data sources 220. The data sources 220 can include one or more repositories for holding one or more types of configuration data, such as a credential repository for maintaining credentials, an ACL repository, and other repositories suitable for storing network device configuration data. The data sources 220 can be used as input to the builders 210. Additionally or alternatively, configuration state from the configuration store 140 can be used as input to the builders 210. For example, collected configuration state from legacy devices can be used to seed or initialize the configuration information for the legacy devices.

The builders 210 can perform checks on the configuration state inputs and generate a complete network device configuration from the inputs to the builders 210. The checks can include verifying that the configuration state inputs comply with polices and rules of the network. As one example, the builders 210 can create a complete configuration when an ACL repository of data sources 220 is updated. The builders 210 can generate the complete configuration by combining the non-ACL configuration state of the released configuration from the configuration store 140 with the ACL configuration information from data sources 220, for example.

The generated configuration can be communicated from the builders 210 to the configuration store 140 where the generated configuration can be stored. As described above, the configuration store 140 can include multiple versioned configurations for the network devices 230 including a released configuration, a collected configuration, a deployed configuration, a generated configuration, and a last-known-good configuration. The generated configuration can be stored as the released configuration when it is received or the generated configuration can undergo an approval process prior to being stored as the released configuration.

The collector service 170 can be used to collect configuration state from the network devices 230. The collector service 170 can be called by other services of the deployment pipeline 200 via an application programming interface (API). For example, the collector service 170 can be called by the integrated configuration tools to collect the deployed configuration of one or more network devices 230 as one step of the update process. As another example, the collector service 170 can be called by the scheduler service 180 to collect the deployed configuration of one or more network devices 230 after the configuration tools 120 update the one or more network devices 230. As another example, the collector service 170 can be called to collect the configuration state of legacy network device in response to a request to collect the configuration state of the legacy devices. Once the configuration state of the legacy network device is added to the configuration store 140, the legacy network device can be updated and audited like the non-legacy network devices.

The auditor service 160 can monitor the configuration store 140 and determine if there is a difference between the released configuration and the collected configuration or the deployed configuration. The deployed configuration can be collected by the collector service 170 when the network devices 230 are updated, or the deployed configuration can be copied from the released configuration when the network devices 230 are updated by the integrated configuration tools. If the auditor service 160 detects a difference between the released configuration and deployed configuration, the auditor service 160 can cause the difference to be remediated by generating a request to update the network device using the integrated configuration tools.

The configuration tools 120 can also generate requests to update the network devices. Thus, requests can come from within the deployment pipeline 200 via the integrated tools and external to the deployment pipeline 200 via the configuration tools 120.

The scheduler service 180 can grant the requests from the configuration tools 120 and the requests from integrated configuration tools so that both the configuration tools 120 and the integrated configuration tools can configure the network devices 230 in a coordinated way. For example, the scheduler service 180 can use a device locking service 280 to ensure or enforce that a particular network device and any dependent network devices (such as neighbors of the particular network device) are only updated by one configuration tool at a time. The device locking service 280 can include a lock for each logical and/or physical device of the network devices 230. A logical device can include multiple logical or physical devices. When a service obtains the lock for a given network device, the service can have exclusive rights to modify the configuration state of the given network device. Thus, obtaining a lock for a given network device can be a precondition to granting a request to configure the given network device. When multiple tools request to configure the same network device, the scheduler service 180 can arbitrate between the competing requests and grant the request of only one of the tools. The arbitration can be based on various arbitration algorithms, such as a fixed priority scheme or round-robin, for example. Multiple requests can be granted in parallel so long as a lock can be obtained for each network device to be configured.

When the scheduler service 180 grants a request of the internal configuration tools, a task of a deployment fleet 250 can be called to configure the selected network device of the network devices 230. The task of the deployment fleet 250 can install or deploy the released configuration to the network devices 230. For example, the released configuration can be transmitted to one or more of the network devices 230 and then installed. After installation, the task of the deployment fleet 250 can call the collector service 170 to collect the deployed configuration. Alternatively, a different service (not shown) can download or read the current configuration state from the network devices 230 when the network devices 230 are updated. The tasks of the deployment fleet 250 can perform pre-checks, post-checks, and roll-back as described above. The tasks of the deployment fleet 250 can record a log of activity on a deployments/events database 260 and signal the scheduler service 180 to release any locks after the deployed configuration has been collected and the deployment log has been recorded on the deployments/events database 260. When the lock is released for a given network device, another tool can update the configuration state of the given network device.

When the scheduler service 180 grants a request of the configuration tools 120, the configuration tools 120 can configure the selected network device of the network devices 230. The configuration tools 120 can install or deploy an updated configuration to the network devices 230. For example, the updated configuration can be transmitted to one or more of the network devices and then installed. After installation, the configuration tools 120 can signal the scheduler service 180 to indicate the configuration is complete. The scheduler service 180 can call the collector service 170 to collect the deployed configuration. The scheduler service 180 can record a log of activity on a deployments/events database 260 and release any locks after the deployed configuration has been collected and the deployment log has been recorded on the deployments/events database 260.

The deployments/events database 260 can be used to store various information about activities and events occurring within the deployment pipeline 200. For example, the deployments/events database 260 can be used to store the version of configuration information pushed to the network devices 230 and the time when the network devices 230 are updated. Thus, an audit trail can be created to provide network engineers with data to effectively troubleshoot network events and make configuration changes during a high severity event. For example, a portal 270 can provide a user interface for accessing the deployments/events database 260, data sources 220, and configuration store 140. The portal 270 can provide access to raw data recorded on the databases. The portal 270 can present notifications and alerts of events occurring in the network 130 and/or the deployment pipeline 200. For example, the scheduler 180 can record when an update is initiated and the portal can show an alert that the update has started.

The deployments/events database 260, data sources 220, and configuration store 140 can include magnetic disks, direct-attached storage, network-attached storage (NAS), storage area networks (SAN), redundant arrays of independent disks (RAID), magnetic tapes or cassettes, DVDs, or any other medium which can be used to store information in a non-transitory way and which can be accessed by one or more services of the deployment pipeline 200.

Figure 3:
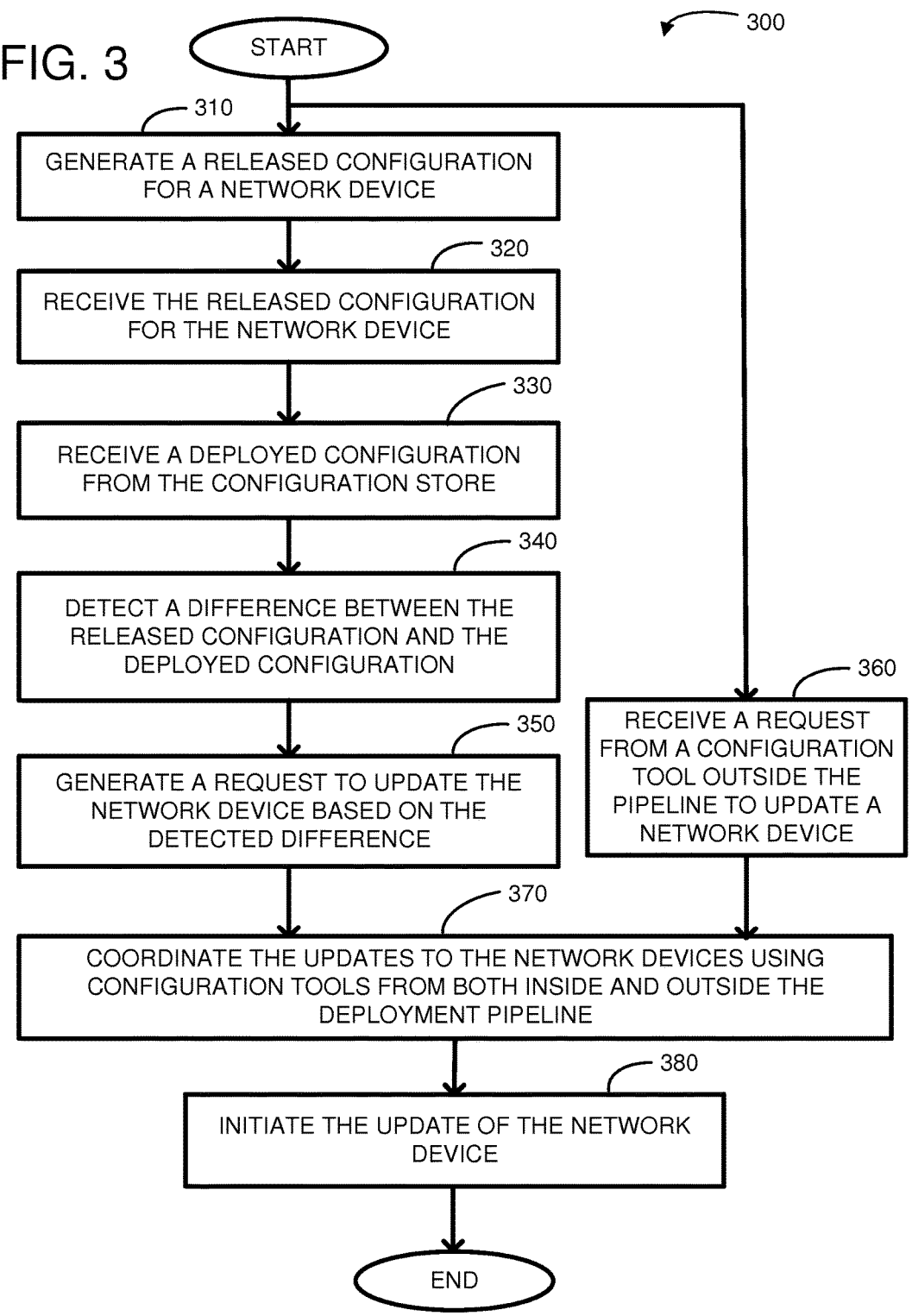
FIG. 3 is a flow diagram of an example method for scheduling the configuration of devices of a network using both configuration tools external to a network device deployment pipeline and configuration tools integrated within the network device deployment pipeline.

FIG. 3 is a flow diagram of an example method 300 for scheduling the configuration of network devices 230 using configuration tools from both inside and outside of a network device deployment pipeline. Requests to update or configure the network devices 230 can be generated independently by the external configuration tools and the integrated configuration tools. The requests from the integrated configuration tools can be generated within the deployment pipeline based on changes in the configuration store 140, such as described at 310-350. The requests from the external configuration tools can be generated outside of or externally to the deployment pipeline, such as described at 360. The requests from the different tools can be communicated to the scheduling service 180 which can coordinate (370) the granting of the requests from the different tools so that both the external configuration tools and the integrated configuration tools are capable of configuring the network.

At 310, a released configuration can be generated for a network device, such as one or more of the network devices 230. The released configuration can represent an authoritative next-provisioned state of the network device. For example, the builders 210 can generate a released configuration in response to a subset of the configuration information being updated in data sources 220. The released configuration can be communicated from the builders 210 to the configuration store 140. As another example, a released configuration can be generated after a code-review approval process, such as by changing a status of the configuration from "under-review" to "released." As yet another example, a legacy network device can be moved into the deployment pipeline framework. In particular, a request to add a legacy device to the deployment pipeline framework can be received and the current configuration state of the legacy device can be read from the legacy device and stored on the configuration store 140 as the released configuration for the legacy device.

At 320, the released configuration for the network device can be received. For example, a generated configuration can be communicated by the builders 210 to the configuration store 140. As another example, the released configuration can be received when the configuration is accepted as the authoritative configuration, such as when a status of the configuration is changed to "released." As yet another example, the released configuration can be received when the current configuration state of a legacy device is received at the configuration store 140. The released configuration can be stored in the configuration store 140.

At 330, a deployed configuration can be received from the configuration store 140. For example, the deployed configuration can be copied from the released configuration. As another example, the configuration state of a newly updated network device can be collected by the collector service 170 and stored in the configuration store 140 as the deployed configuration. For example, the collector service 170 can remotely login to the network device, execute a "show run" on the network device, and capture the output of the command (such as by piping the output to a log file). The collected configuration can be stored in the configuration store 140 as the deployed configuration as a backend step of the network device update. As another example, the current configuration state of a legacy device can be read and stored as the deployed configuration for the legacy device in response to a request to add the legacy device to the deployment pipeline framework. Additionally, configuration state from the network devices 230 can be stored as a collected configuration when the configuration state is collected at times other than during an update of the network devices 230.

At 340, a difference between the released configuration and the deployed configuration can be detected. For example, the auditor service 160 can perform a comparison between the released configuration and the deployed configuration to determine if there is a difference between them. When doing the comparison between the released configuration and the deployed configuration, some parts of the configuration can be filtered or masked. In particular, a portion of the configuration can be excluded from the comparison between the released configuration and the deployed configuration. For example, when a portion of the configuration includes data that does not affect the operation of the network device it may be desirable to exclude this information from the comparison. As a specific example, the deployed configuration may include data that is hardware- or topology-specific, but does not affect the operation of the network device. However, configuration data that affects the operation of the network device can be included in the comparison.

At 350, a request to update the network device using the integrated configuration tools 150 can be generated. The request is generated in response to detecting the difference between the released configuration and the deployed configuration, and the objective of the request is to update the network device so that the deployed configuration matches the released configuration after the update. The request can be for a single network device or a set of network devices. The request can be for a physical network device or a logical network device that may be made of multiple physical network devices. The request can specify whether all of the network devices of the request are to be configured at the same time, or whether the network devices of the request can be configured independently. The request can specify a task or tasks of the deployment fleet 250 that can be used to perform the update. The request can be communicated to the scheduling service 180 which can schedule the update specified by the request.

At 360, a request to update the network device using the configuration tools 120 can be generated. The request can be generated externally to the deployment pipeline and communicated to the deployment pipeline. Thus, the request can be received by the scheduling service 180 which can schedule the update specified by the request. The request can be for a single network device or a set of network devices. The request can be for a physical network device or a logical network device that may be made of multiple physical network devices. The request can specify whether all of the network devices of the request are to be configured at the same time, or whether the network devices of the request can be configured independently. The request can specify a specific tool or tools of the configuration tools 120 that can be used to perform the update.

At 370, the updates of the network devices can be coordinated. The updates can occur using both the integrated configuration tools 150 and the configuration tools 120. The updates can be scheduled based on one more policies, rules, events, or other suitable criteria. For example, the update for a particular network device can be scheduled for a specific window of time, based on a measured performance criteria being satisfied, based on another network device being updated, or based on an event within the network occurring. Coordinating the updates can include allowing a particular network device and any dependent network devices (such as neighbors of the particular network device) to be updated by only one configuration tool at a time. Any dependent network devices can be specified in the request to update the network device, for example. When multiple tools request to configure the same network device, the scheduler service 180 can arbitrate between the competing requests and grant the request of only one of the tools. The arbitration can be based on various arbitration algorithms, such as a fixed priority scheme or round-robin, for example.

At 380, the update of the network devices can be initiated by granting a request to update one or more network devices. When the request to update the network devices using the configuration tools 120 is granted, the update can be initiated by signaling to the configuration tools 120 to load or install updated configuration state on the network devices specified in the grant. When the request to update the network device using the integrated configuration tools 150 is granted, the update can be initiated by calling or executing one or more of the tasks of the deployment fleet 250 within the deployment pipeline. As a result of the update using the integrated configuration tools 150, the released configuration can be loaded or installed on the network devices specified in the grant. The update is described in further detail with reference to FIG. 4.

Figure 4:
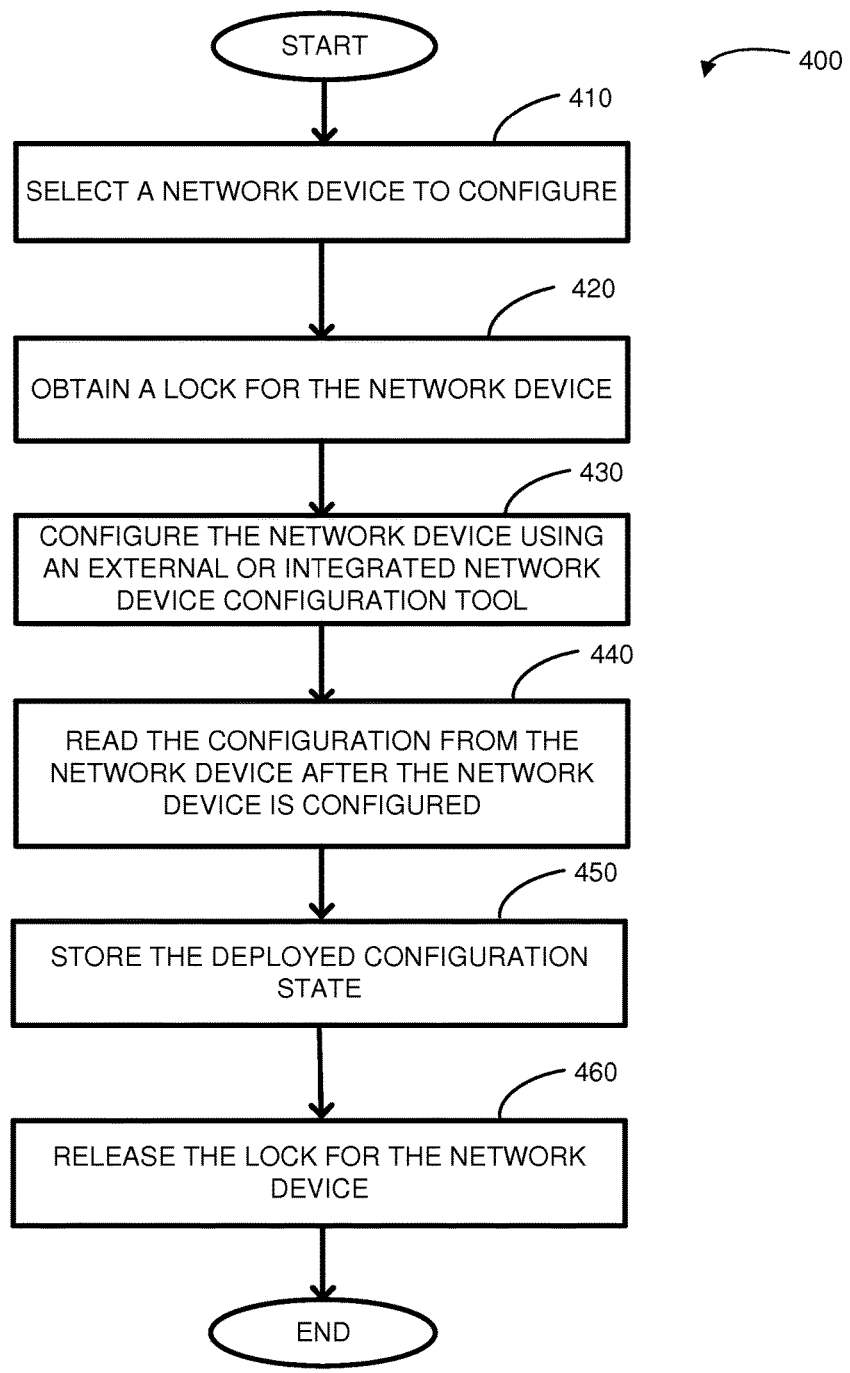
FIG. 4 is a flow diagram of an example method for configuring network devices.

FIG. 4 is a flow diagram of an example method 400 for updating a network device, such as one of the network devices 230. The update can be performed by either the configuration tools 120 or the integrated configuration tools 150. During the update workflow, the authoritative configuration store 140 can be updated with the latest configuration state collected from the updated network device. Thus, the configuration store 140 can be a central repository for up-to-date configuration information of the network devices whether the network devices are updated by either the configuration tools 120 outside of the deployment pipeline or the integrated configuration tools 150 inside of the deployment pipeline.

At 410, a network device is selected to be configured. For example, a request to update the network device can be granted. The granted request can correspond to either the configuration tools 120 or the integrated configuration tools 150.

At 420, a lock corresponding the network device can be obtained. The tool or service that obtains the lock can have exclusive access to modify the configuration state of the network device. The exclusive access may reduce the likelihood of operational network state being inadvertently overwritten or intermediate network state being inadvertently captured. The method 400 can block (e.g., wait or stall) until the lock is obtained. If the lock is not obtained within a threshold amount of time, the service managing the locks, such as the device locking service 280, can indicate a "time-out" or "lock-unavailable" condition, and can abort the update of the network device. By indicating that the lock is not available within a threshold period of time, the potential for deadlock within the deployment pipeline can be reduced. A time-out event can be logged in the deployments/events database 260 and/or an alert can be displayed at the portal 270 when a lock is not obtained within the threshold amount of time.

At 430, the network device can be configured using either the configuration tools 120 or the integrated configuration tools 150. Configuring the network device from within the deployment pipeline using the integrated configuration tools 150 can include one or more front-end steps. For example, the network device can be configured after satisfying one or more pre-checks or preconditions, such as obtaining one or more locks (as described at 420). Another example of a precondition is determining whether the current configured state of the network device matches the deployed state of the network device stored in the configuration store 140. Specifically, the collector service 170 can collect the present or current state of the network device and if the current configuration does not match the deployed configuration (e.g., the precondition fails), then the update to the network device can be aborted, and the event can be logged in the deployments/events database 260 and/or an alert can be displayed at the portal 270. It can be desirable for the present state of the network to match the deployed configuration to reduce the likelihood of operational network state being inadvertently overwritten.

Configuring the network device using the integrated configuration tools 150 can include installing the released configuration onto the network device using one or more of the tasks of the deployment fleet 250. For example, the deployment fleet 250 can be used to update all of the configuration state of the network device associated with the released configuration (a full configuration). As another example, the deployment fleet 250 can be used to update a portion of the configuration state associated with the released configuration (an incremental configuration). The choice between performing a full or an incremental configuration can be determined by analyzing the differences between the released configuration and the deployed configuration. For minor differences, performing an incremental configuration may potentially reduce the time, risk, and/or resources for performing the incremental configuration. The partial configuration can update the configuration state of the network device that corresponds to differences between the released configuration and the deployed configuration. Thus, after a partial configuration is complete, the released configuration and the deployed configuration can be the same, just as if a full configuration were performed.

Configuring the network device using the integrated configuration tools 150 can include one or more back-end steps, such as 440 and 450, performed after the released configuration state is pushed to the network devices. For example, the back-end steps can include verifying whether the configuration of the network device was successful (e.g., post-checks) and supporting automated rollback to a last-known good configuration. If a post-check fails, then the event can be logged in the deployments/events database 260 and/or an alert can be displayed at the portal 270.

Configuring the network device from outside the deployment pipeline using the configuration tools 120 can include installing updated configuration state onto the network device using one or more of the configuration tools 120. The update can include front-end steps and back-end steps similar to configuring the network device using the integrated configuration tools 150. However, the configuration tools 120 operate outside of the deployment pipeline and generally do not have access to the configuration store 140.

At 440, the updated configuration state from the network device can be read after the network device is updated. For example, the collector service 170 or another service can be called to read or capture the configuration state from the network device. The updated configuration state can be read regardless of whether the update was performed by the integrated configuration tools 150 or the configuration tools 120. In this manner, the current configuration state of the network device can be captured by the deployment pipeline, even if the network device was updated by the configuration tools 120. As an alternative to capturing the configuration state after an update by the integrated configuration tools 150, the configuration state can be copied from the released configuration.

At 450, the captured (or copied) configuration state from 440 can be stored as the deployed configuration state. In other words, the deployed configuration can be updated or synchronized so that the deployed configuration reflects the current configuration state of the recently updated (at 430) network device. When using the integrated configuration tools 150 to perform the update, a post-check can compare the deployed configuration to the released configuration to determine if the update is successful. If the deployed configuration matches the released configuration, the configuration update is successful. Otherwise, a rollback to the last-known good configuration can be initiated and/or an event can be logged in the deployments/events database 260 and/or an alert can be displayed at the portal 270. When using the configuration tools 120, the deployment pipeline cannot compare the released configuration to the deployed configuration because the configuration tools 120 operate externally to the deployment pipeline. Thus, the captured configuration state from 440 can also be stored as the released configuration state when using the configuration tools 120 so that the released configuration will match the deployed configuration.

At 460, the lock for the network device can be released. Freeing the lock can potentially allow another tool to access the network device.

Figure 5:
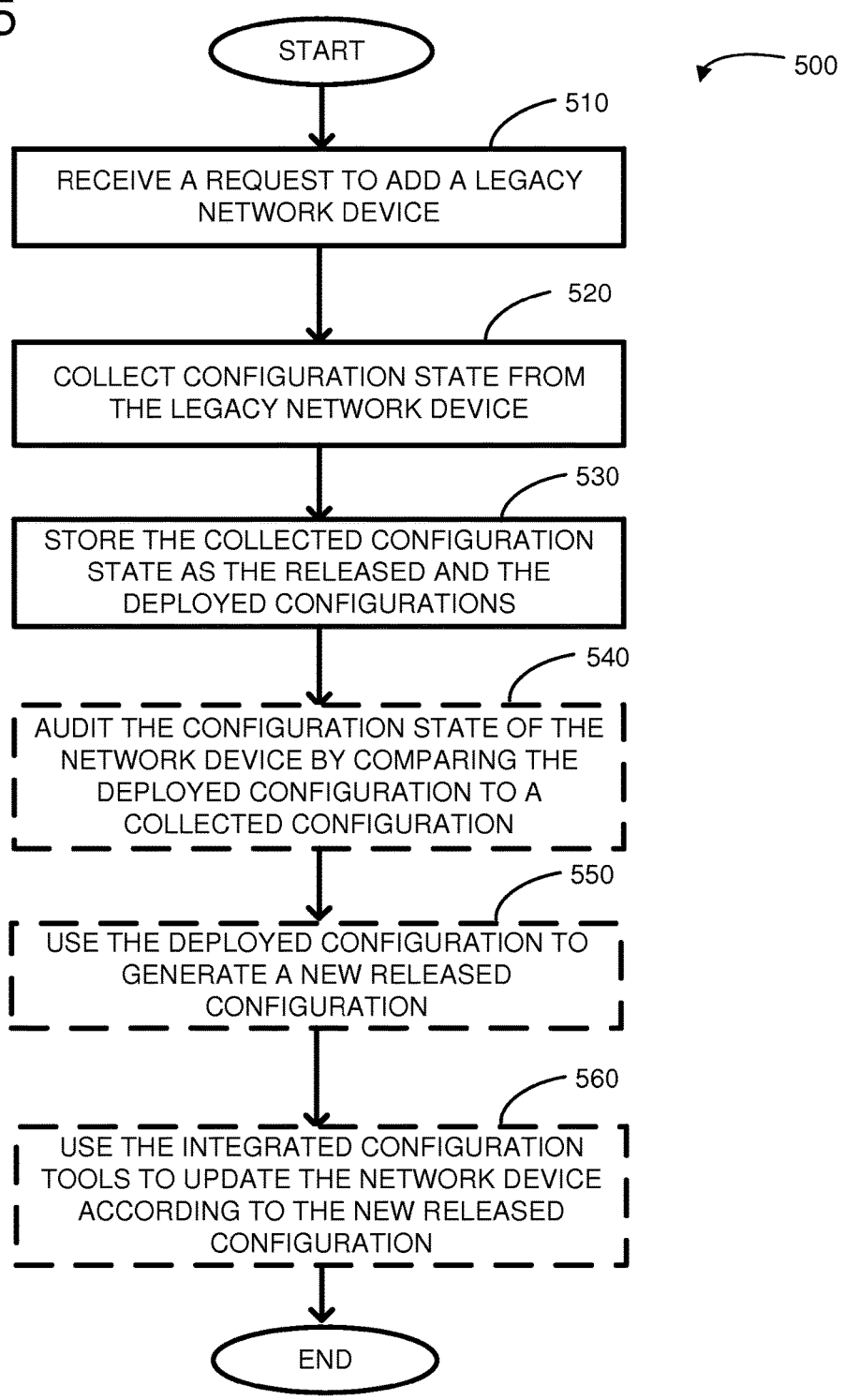
FIG. 5 is a flow diagram of an example method for migrating a legacy network device into the network device deployment framework.

FIG. 5 is a flow diagram of an example method 500 for migrating a legacy network device into the network device deployment pipeline framework. At 510, a request to add a legacy network device into the network device deployment pipeline framework can be received. The request can be for a single physical network device, multiple network devices, and/or a logical network device. The request can include a network or IP address or other identifier for each legacy network device so that the deployment pipeline can access the device. Once the legacy network devices are migrated into the deployment pipeline framework, future updates to the devices can be coordinated with and performed by the integrated configuration tools 150 and the configuration state of the devices can be monitored, analyzed, and audited using the tools of the deployment pipeline.

At 520, configuration state of the legacy network device is collected. For example, the collector service 170 can access the legacy network device and read the configuration state of the device. As a specific example, the collector service 170 can remotely login to the legacy network device, execute a "show run" on the legacy network device, and capture the output of the command.

At 530, the collected configuration state of the legacy network device can be stored on the configuration store 140. In particular, the collected configuration state can be stored as the released and the deployed configurations. The legacy network device can be added to the set of the network devices that are managed by the deployment pipeline.

At 540, the configuration state of the added legacy network device can be audited. For example, the collector service 170 can access the added legacy network device and read the configuration state of the device. The collected configuration state of the device can be stored as the collected configuration on the configuration store 140. So long as any changes to the configuration state of the added legacy network device are made by the integrated configuration tools 150 or the configuration tools 120 in coordination with the deployment pipeline, the collected configuration will match the deployed configuration. However, if the collected configuration differs from the deployed configuration, then manual and/or unauthorized changes may have been made to the added legacy network device. If any changes are detected, an event can be logged in the deployments/events database 260 and/or an alert can be displayed at the portal 270.

At 550, the deployed configuration of the added legacy network device can be used to generate a new released configuration for the device. In particular, the deployed configuration can be a source or seed for the builders 210 and any changes to the configuration state can be incremental to the state captured when the legacy network device was added to the deployment pipeline framework. Thus, the configuration state at the time the legacy network device was added to the deployment pipeline framework does not need to be recreated in a separate database in order for the builders 210 to be used to update the configuration state of the added legacy network device.

At 560, the integrated configuration tools 150 can be used to update the configuration state of the added legacy network device according to the new released configuration for the device. Updates to the configuration state of the added legacy network device can be tracked in the configuration store 140. For example, method 400 can be used to update the added legacy network device and the configuration store according to the new released configuration for the device. In sum, the method 500 can be used to migrate a legacy network device, which was not managed by the deployment pipeline, into the deployment pipeline framework where it can be maintained, audited, and updated using the framework and the configuration tools of the deployment pipeline.

Figure 6:
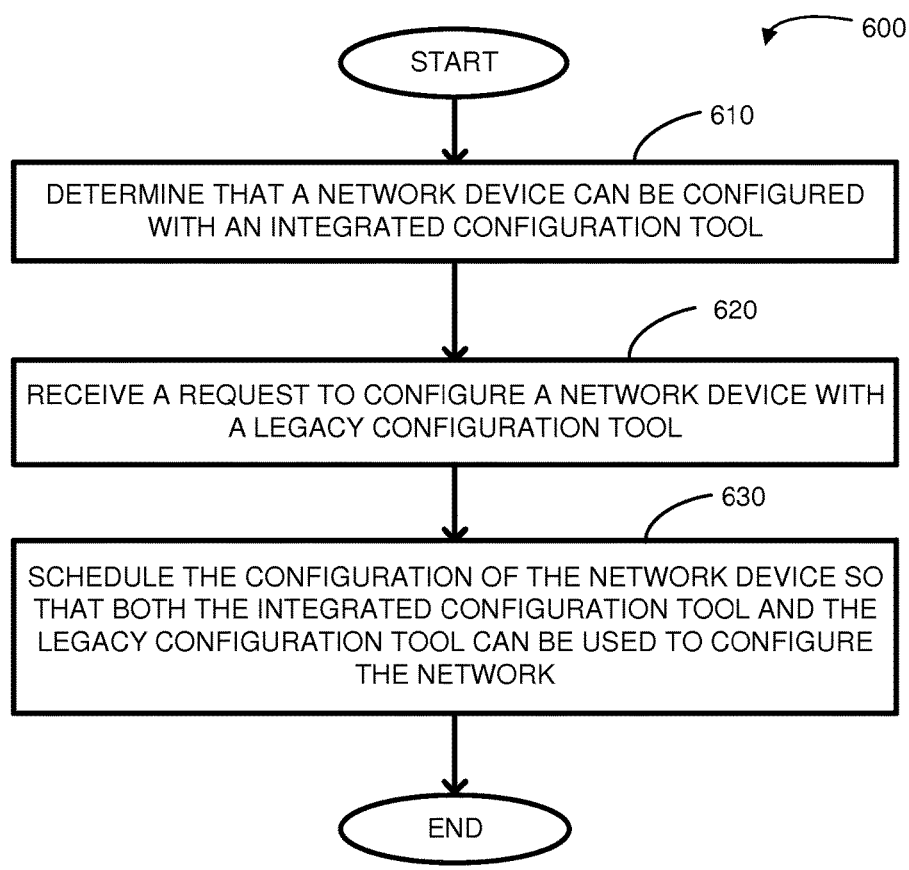
FIG. 6 is a flow diagram of an example method for coordinating configurations of network devices using configuration tools within and external to a network device deployment pipeline.

FIG. 6 is a flow diagram of an example method 600 for coordinating configurations of network devices using both legacy configuration tools and configuration tools integrated within a network device deployment pipeline. At 610, it can be determined that a network device can be configured with an integrated configuration tool of the deployment pipeline. For example, the deployment pipeline can include an authoritative configuration store. Updates to the network devices can be automated based on changes or differences being detected within the configuration store. For example, the configuration store can include a released configuration of respective network devices representing the next-provisioned state of respective network devices, and a deployed configuration of respective network devices representing the current-provisioned state of respective network devices. The integrated tools of the deployment pipeline can be used to generate updated configuration state for the network device by updating the released configuration of the network device. Thus, the deployment pipeline can detect that a network device can be configured with the integrated configuration tools when a difference is detected between the released and the deployed configuration states. In particular, the network device deployment pipeline can determine that a network device can be updated using the integrated configuration tools when the next-provisioned state of the network device is different from the current-provisioned state of the network device.

At 620, a request can be received to configure the network device with a legacy configuration tool. In contrast to the integrated configuration tools, updates by the legacy configuration tools are not driven by changes in the authoritative configuration store. Thus, the legacy configuration tools will communicate a request to the deployment pipeline rather than having the deployment pipeline automatically detect that an update is ready by detecting a change or difference in the configuration store.

At 630, the configuration of the network device can be scheduled so that both the legacy configuration tools and the integrated configuration tools can be used to configure the network. For example, the deployment pipeline can provide a device locking service or other functionality so that only one tool can update the configuration state of a particular network device at a time. When a respective tool obtains a lock for a network device, the tool can update the configuration state of the network device. By having the legacy configuration tools request and wait to be granted before updating the configuration state of the network devices, the network device deployment pipeline can be aware of and coordinate updates by the legacy configuration tools even though the legacy configuration tools are not completely integrated within the network device deployment pipeline. This feature may potentially reduce development costs to maintain the network and may potentially reduce or eliminate network degradation and outages caused by different tools overwriting or reading intermediate network device state used by other tools.

Figure 7:
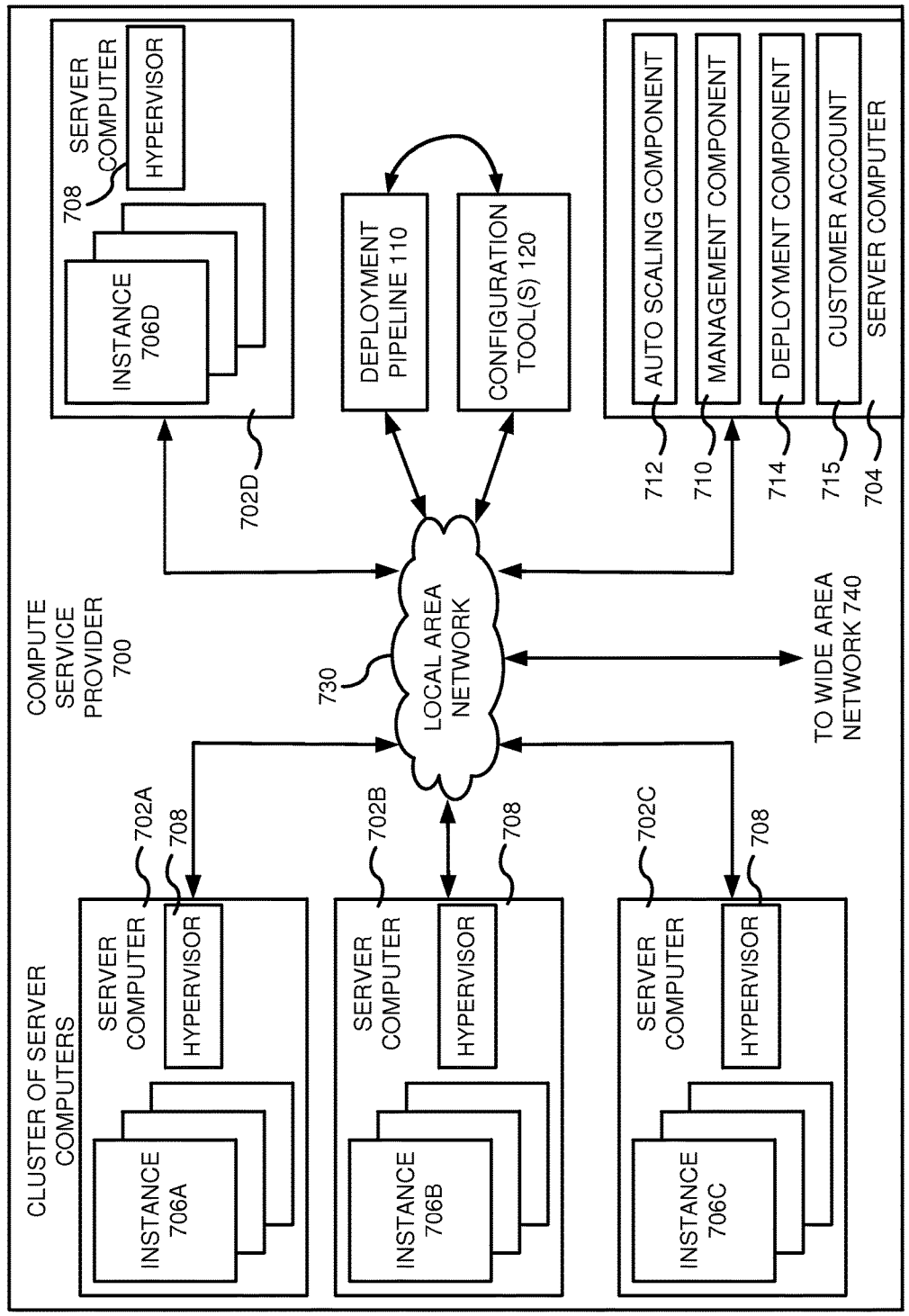
FIG. 7 is an example system diagram showing a plurality of virtual machine instances running in the multi-tenant environment.

FIG. 7 is a computing system diagram of a network-based compute service provider 700 that illustrates one environment in which embodiments described herein can be used. By way of background, the compute service provider 700 (i.e., the cloud provider) is capable of delivery of computing and storage capacity as a service to a community of end recipients. In an example embodiment, the compute service provider can be established for an organization by or on behalf of the organization. That is, the compute service provider 700 may offer a "private cloud environment." In another embodiment, the compute service provider 700 supports a multi-tenant environment, wherein a plurality of customers operate independently (i.e., a public cloud environment). Generally speaking, the compute service provider 700 can provide the following models: Infrastructure as a Service ("IaaS"), Platform as a Service ("PaaS"), and/or Software as a Service ("SaaS"). Other models can be provided. For the IaaS model, the compute service provider 700 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 700 using networked client devices, such as desktop computers, laptops, tablets, smartphones, etc. running web browsers or other lightweight client applications. Those skilled in the art will recognize that the compute service provider 700 can be described as a "cloud" environment.

The particular illustrated compute service provider 700 includes a plurality of server computers 702A-702D. While only four server computers are shown, any number can be used, and large centers can include thousands of server computers. The server computers 702A-702D can provide computing resources for executing software instances 706A-706D. In one embodiment, the instances 706A-706D are virtual machines. As known in the art, a virtual machine is an instance of a software implementation of a machine (i.e. a computer) that executes applications like a physical machine. In the example of virtual machine, each of the servers 702A-702D can be configured to execute a hypervisor 708 or another type of program configured to enable the execution of multiple instances 706 on a single server. Additionally, each of the instances 706 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 704 can be reserved for executing software components for managing the operation of the server computers 702 and the instances 706. For example, the server computer 704 can execute a management component 710. A customer can access the management component 710 to configure various aspects of the operation of the instances 706 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 712 can scale the instances 706 based upon rules defined by the customer. In one embodiment, the auto scaling component 712 allows a customer to specify scale-up rules for use in determining when new instances should be instantiated and scale-down rules for use in determining when existing instances should be terminated. The auto scaling component 712 can consist of a number of subcomponents executing on different server computers 702 or other computing devices. The auto scaling component 712 can monitor available computing resources over an internal management network and modify resources available based on need.

A deployment component 714 can be used to assist customers in the deployment of new instances 706 of computing resources. The deployment component can have access to account information associated with the instances, such as who is the owner of the account, credit card information, country of the owner, etc. The deployment component 714 can receive a configuration from a customer that includes data describing how new instances 706 should be configured. For example, the configuration can specify one or more applications to be installed in new instances 706, provide scripts and/or other types of code to be executed for configuring new instances 706, provide cache logic specifying how an application cache should be prepared, and other types of information. The deployment component 714 can utilize the customer-provided configuration and cache logic to configure, prime, and launch new instances 706. The configuration, cache logic, and other information may be specified by a customer using the management component 710 or by providing this information directly to the deployment component 714. The instance manager can be considered part of the deployment component.

Customer account information 715 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 730 can be utilized to interconnect the server computers 702A-702D and the server computer 704. The network 730 can be a local area network (LAN) and can be connected to a Wide Area Network (WAN) 740 so that end users can access the compute service provider 700. It should be appreciated that the network topology illustrated in FIG. 7 has been simplified and that many more networks and networking devices can be utilized to interconnect the various computing systems disclosed herein.

A network device configuration deployment pipeline 110 can be used to deploy and/or update the configuration state of one or more of the network devices of the network 730. The network device configuration deployment pipeline can include the integrated configuration tools 150 for updating the devices and the configuration store 140 for storing authoritative device configurations. For example, a released configuration and a deployed configuration can be maintained for each network device. When a difference between the released configuration and the deployed configuration for a network device is detected, the deployment pipeline 110 can generate a request to update the network device using the integrated configuration tools 150. Additionally or alternatively, the configuration tools 120 can generate requests to update the network devices using the configuration tools 120. The deployment pipeline 110 can coordinate the updates from the different tools so that both the configuration tools 120 and the integrated configuration tools 150 are capable of configuring the network in a highly available manner. For example, locks can be provided for each of the network devices, and a configuration tool obtaining the lock for a network device can be given exclusive rights to modify the configuration state of the network device while it holds the lock. After a network device is updated with the configuration tools 120 or the integrated configuration tools 150, the configuration state of the network device can be read from the network device and stored on the configuration store 140 so that the state of the network is available for analysis and auditing. The lock for a network device can be released when the tool is finished updating the network device and the updated configuration state has been stored on the configuration store 140.

Figure 8:
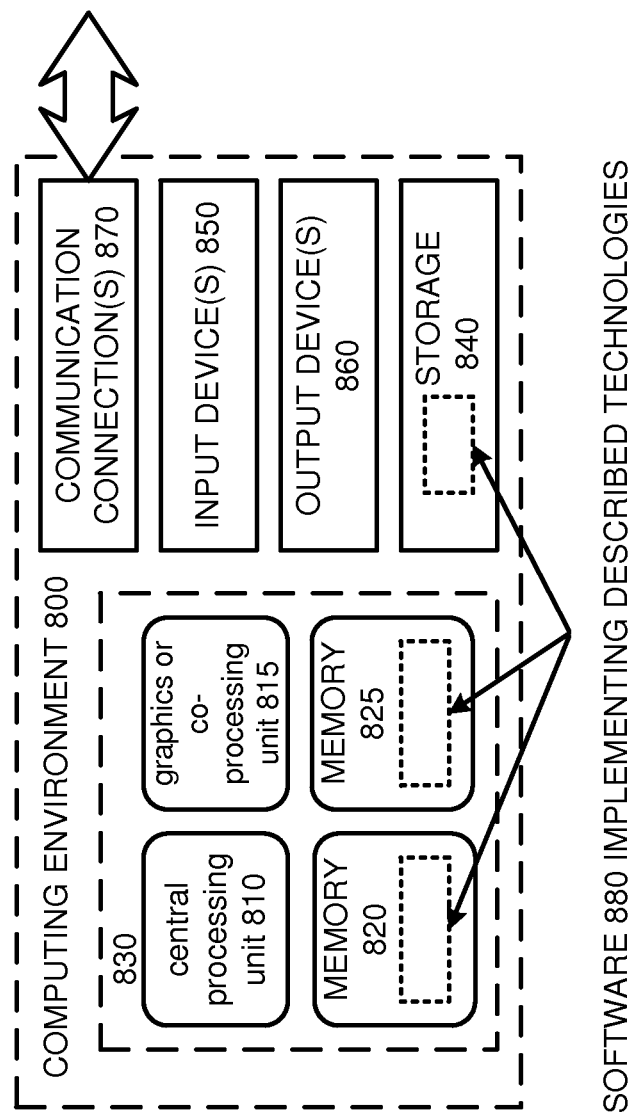
FIG. 8 depicts a generalized example of a suitable computing environment in which the described innovations may be implemented.

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A method of configuring a network device of a network, the method comprising:

receiving a request to configure the network device with an integrated configuration tool of a network device deployment pipeline;

receiving a request to configure the network device with a legacy configuration tool, the legacy configuration tool not integrated within the network device deployment pipeline;

coordinating a granting of the request from the legacy configuration tool and a granting of the request from the integrated configuration tool so that both the legacy configuration tool and the integrated configuration tool interoperate to configure the network device; and granting the request to configure the network device with the legacy configuration tool when a lock corresponding to the network device is obtained, the lock obtained in response to determining that the network device and a dependent network device of the network device are not being configured by another configuration tool, the granting giving the legacy configuration tool exclusive rights to update a configuration state of the network device while the lock is retained.

2. The method of claim 1, further comprising:
receiving an indication that the legacy configuration tool is finished configuring the network device;
collecting the configuration state from the network device after the indication is received and while the lock is retained; and
storing the collected configuration state as a deployed configuration in an authoritative configuration store separate from the network device.

3. The method of claim 2, further comprising:
auditing the configuration state of the network device configured with the legacy configuration tool by determining any differences between the deployed configuration stored in the authoritative configuration store and a configuration state collected from the network device at a later time.

4. The method of claim 1, further comprising:
receiving a request to integrate a legacy network device of the network into a workflow of the network device deployment pipeline;
collecting a configuration state of the legacy network device; and
storing the collected configuration state of the legacy network device in an authoritative configuration store separate from the legacy network device.

5. The method of claim 4, further comprising:
generating an updated configuration state for the legacy network device using the collected configuration state of the legacy network device as a seed for the updated configuration state; and
generating a request to configure the legacy network device with the integrated configuration tool according to the generated updated configuration state.

6. The method of claim 1, wherein a request is generated by the integrated configuration tool when a difference is detected between a released configuration and a deployed configuration of a particular network device, the released configuration and the deployed configuration stored in an authoritative configuration store separate from the particular network device.

7. The method of claim 1, wherein the dependent network device of the network device is a neighbor of the network device.

8. A computer-readable storage medium including instructions that upon execution cause a computer system to:

at a network device deployment pipeline, receive a request from a non-integrated configuration tool to configure a network device of a network;
schedule the configuration of the network device so that both an integrated configuration tool of the network device deployment pipeline and the non-integrated configuration tool can interoperate to configure the network device; and
grant the request from the non-integrated configuration tool to configure the network device in response to obtaining a lock on the network device after determining that the network device and a dependent network device of the network device are not being configured by another configuration tool.

9. The computer-readable storage medium of claim 8, wherein the instructions, upon execution, further cause the computer system to:
read an updated configuration state from the network device after the non-integrated configuration tool configures the network device; and
store the updated configuration state read from the network device in a configuration store for the network device deployment pipeline.

10. The computer-readable storage medium of claim 9, wherein the instructions, upon execution, further cause the computer system to:
read a current configuration state from the network device;
compare the current configuration state to the updated configuration state; and
determine whether the current configuration state is different from the updated configuration state.

11. The computer-readable storage medium of claim 8, wherein the instructions, upon execution, further cause the computer system to:
receive a request to add a legacy network device of the network into a workflow of the network device deployment pipeline;
collect a configuration state of the legacy network device; and
store the collected configuration state in an authoritative configuration store separate from the legacy network device.

12. The computer-readable storage medium of claim 11, wherein the instructions, upon execution, further cause the computer system to:
use the stored configuration state in the authoritative configuration store to build an updated configuration state for the legacy network device.

13. The computer-readable storage medium of claim 11, wherein the instructions, upon execution, further cause the computer system to:
update the legacy network device using the integrated configuration tool of the network device deployment pipeline.

14. The computer-readable storage medium of claim 8, wherein the instructions, upon execution, further cause the computer system to:
generate a request to configure the network device using the integrated configuration tool when a present configuration state of the network device is different from a next configuration state of the network device, the present and next configuration states stored in a configuration store associated with the network device deployment pipeline.

15. The computer-readable storage medium of claim 8, wherein the instructions, upon execution, further cause the computer system to:
- call a device locking service to enforce that only one configuration tool can configure the network device at a given time.

16. A network device deployment pipeline, the pipeline comprising:
- an integrated configuration tool for configuring network devices of the network;
- a scheduling service for coordinating configuration of the network devices using both the integrated configuration tool and an external configuration tool, the external configuration tool configured to operate outside of a framework of the network device deployment pipeline; and
- a locking service in communication with the scheduling service, the locking service configured to grant exclusive access to update a configuration state of a respective network device of the network in response to determining that the respective network device and a dependent network device of the respective network device are not being configured by more than one configuration tool.

17. The pipeline of claim 16, further comprising:
- an authoritative configuration store for storing configuration states of the network devices, wherein the configuration states corresponding to a respective network device comprise a deployed configuration state and a released configuration state; and
- an auditor service configured to:
    - detect a difference between the deployed configuration state and the released configuration state for a first network device; and
    - generate a request to update the first network device with the integrated configuration tool when the difference is detected.

18. The pipeline of claim 17, further comprising:
- a collector service configured to collect an updated configuration state from a second network device when the second network device is configured using the integrated configuration tool or the external configuration tool, and store the collected updated configuration state from the second network device on the authoritative configuration store.

19. The pipeline of claim 18, wherein the collector service is further configured to collect a configuration state from a legacy network device in response to a request to add the legacy network device to a framework of the network device deployment pipeline.

20. The pipeline of claim 18, wherein:
- the collector service is further configured to collect a current configuration state from the second network device when the second network device is not being configured; and
- the auditor service is further configured to compare the current configuration state to the configuration state stored on the authoritative configuration store.

\* \* \* \* \*